May 20, 1941.  H. L. MIKA  2,242,535
TRUCK TANK
Filed Oct. 18, 1937  3 Sheets-Sheet 1
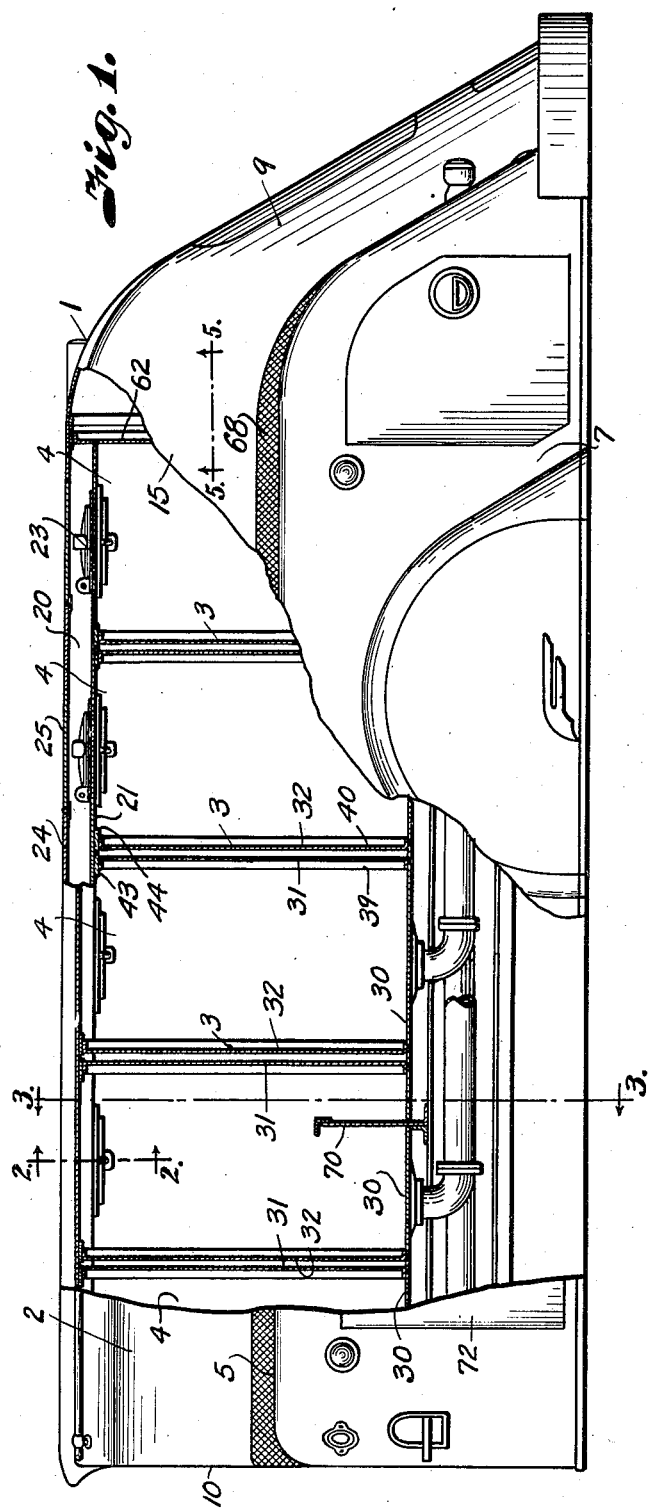
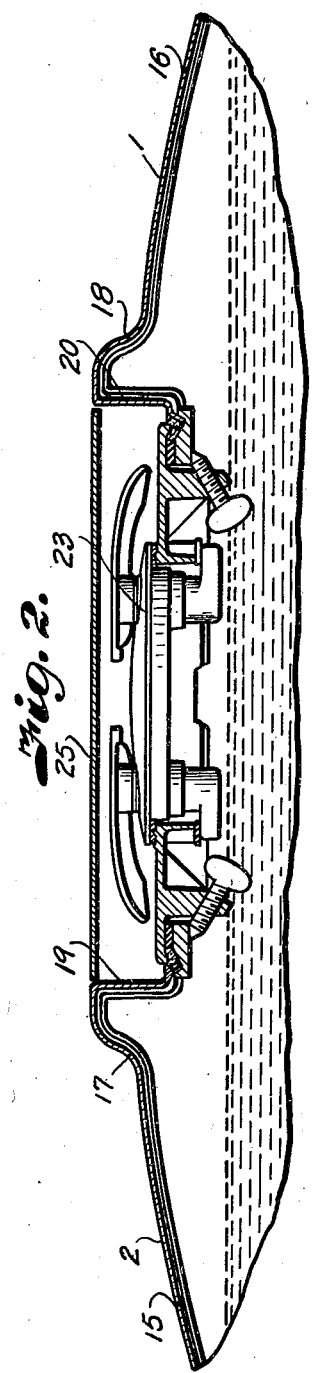
INVENTOR
Herbert L. Mika.
BY
Arthur C. Brown
ATTORNEY May 20, 1941. H. L. MIKA 2,242,535
TRUCK TANK
Filed Oct. 18, 1937 3 Sheets-Sheet 2
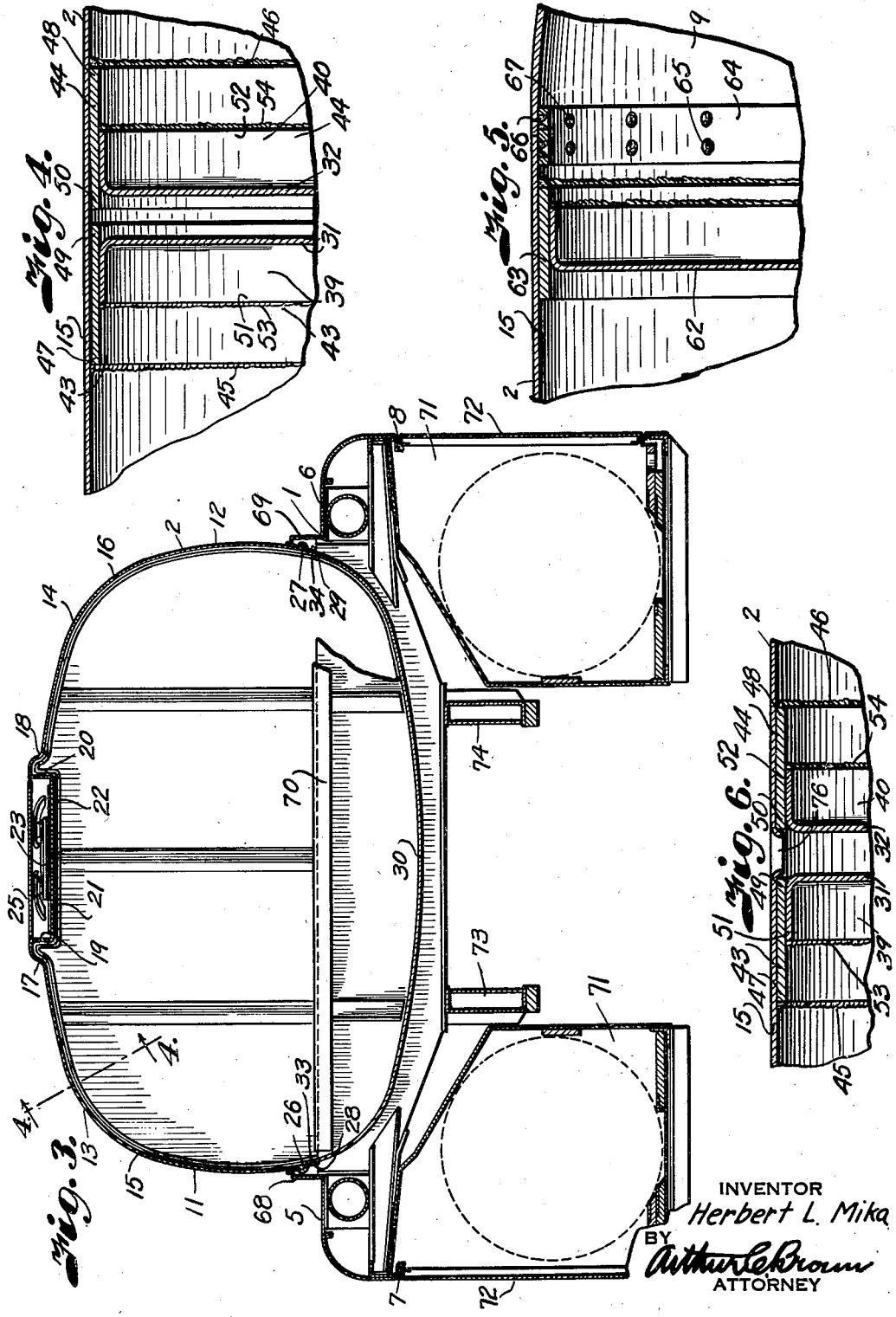
INVENTOR
Herbert L. Mika
BY
Arthur L. Brown
ATTORNEY May 20, 1941.  H. L. MIKA  2,242,535
TRUCK TANK
Filed Oct. 18, 1937  3 Sheets-Sheet 3
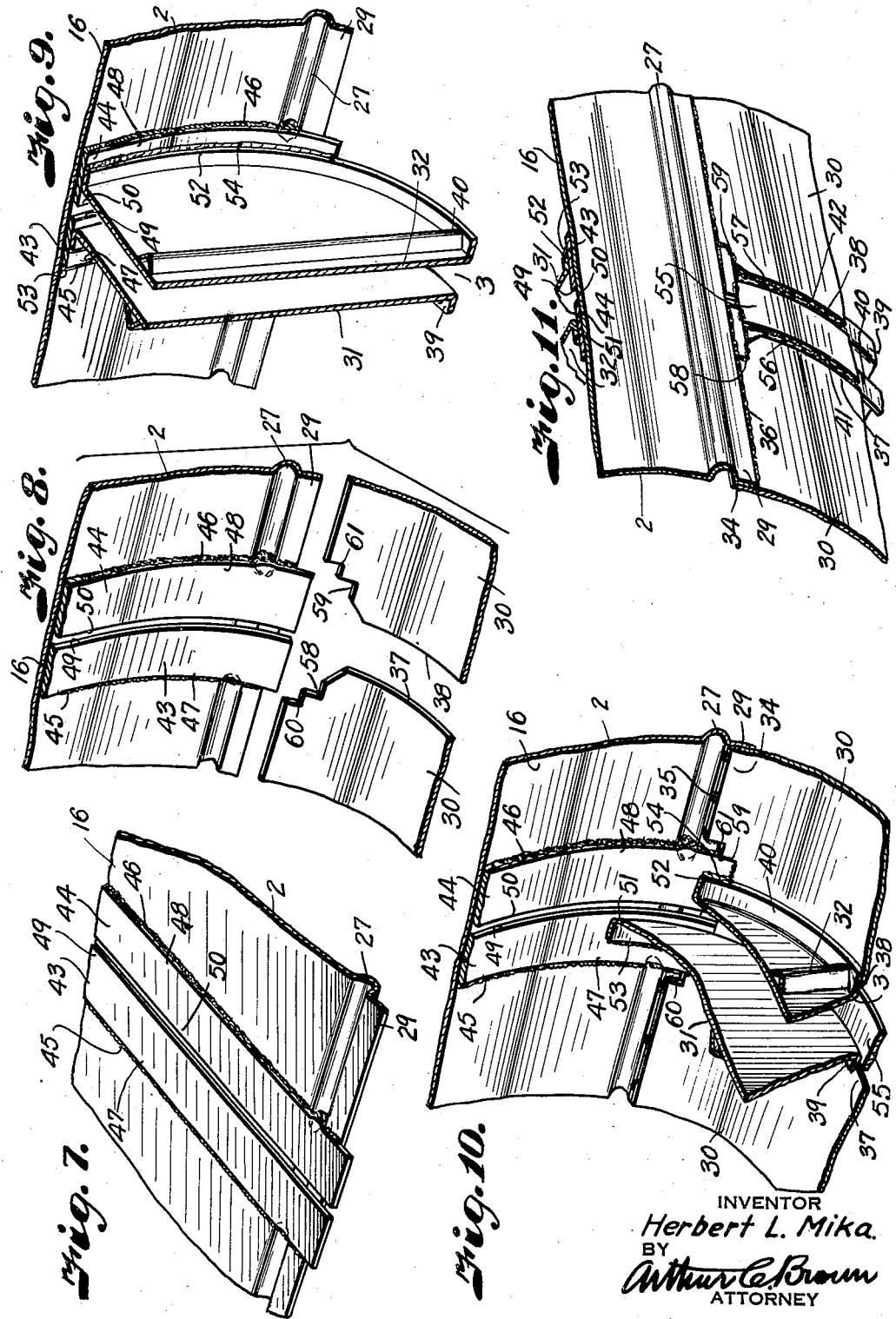
INVENTOR
Herbert L. Mika.
BY
Arthur C. Brown
ATTORNEY Patented May 20, 1941

2,242,535

UNITED STATES PATENT OFFICE 2,242,535

TRUCK TANK

Herbert L. Mika, Kansas City, Kans., assignor to Standard Steel Works, North Kansas City, Mo., a corporation of Missouri Application October 18, 1937, Serial No. 169,624

8 Claims. (Cl. 220—22)

This invention relates to welded tanks and particularly truck tanks having bulkheads, surge plates, reinforcing members or the like welded to the sheets forming the tank body. In tanks of this character the welding usually shows on the exterior of the tank and it has been necessary to cover the welding with various forms of bandings, mouldings and the like in order that the tank may present a neat and well finished exterior. This practice has been satisfactory up to the advent of the present stream-lined tank designs which require smooth exteriors free from visible seams, beads, and the like which destroy stream-line effects. It is now the practice to construct the exposed portions of a tank of this character with continuous metal sides free from seams and to weld the partitions to the interior surfaces of the tank body, but this welding causes the wall of the tank to buckle and bend out of shape, and to overcome this difficulty the hollows and irregular surfaces are filled with solder or the like and then the surfaces are dressed down to obtain the desired smoothness. Such construction is not only very expensive but the solder adds materially to the weight of the tank.

It is, therefore, a principal object of the present invention to provide a tank construction whereby the partitions or the like may be welded without buckling of the tank walls that are exposed to view.

Other important objects of the invention are to provide a tank which is readily assembled; to provide a tank construction wherein substantially all of the welds are made out in the open; and to provide a tank construction wherein the exposed surfaces present smooth, stream-lined effects without the use of solder or other filling material.

In accomplishing these and other objects of the invention, as hereinafter pointed out, I have provided improved details of structure, the preferred form of which is illustrated in the accompanying drawings, wherein:

Fig. 1 is a side elevational view of a tank constructed in accordance with the present invention, a part of the side wall being broken away and showing the partition bulkheads in section to better illustrate my improved method of welding the partitions to the wall of the tank to divide the tank into a plurality of liquid-tight compartments.

Fig. 2 is an enlarged detail section through the upper portion of the tank on the line 2—2 of Fig. 1, particularly illustrating the manhole cover mounting and cat-walk along the top of the tank.

Fig. 3 is a cross-section through the tank on the line 3—3 of Fig. 1.

Fig. 4 is an enlarged detail section through the tank on the line 4—4 of Fig. 3, particularly illustrating the weld of the partition bulkheads to the portion of tank wall which is exposed to view.

Fig. 5 is a section on the line 5—5 of Fig. 1.

Fig. 6 is an enlarged detail section illustrating one of the vent holes between the bulkheads.

Fig. 7 is a detail perspective view of a portion of the sheet forming the upper side wall of the tank and showing the anchoring strips to which the bulkheads are welded.

Fig. 8 is a similar view showing the portion of the tank illustrated in Fig. 7 rolled to the curvature it is to assume in the tank, and located in spaced relation to the adjacent sheets forming the bottom portion of the tank.

Fig. 9 is a similar view showing the bulkheads welded to the anchoring strips.

Fig. 10 is a similar perspective section showing the sheets forming the lower portion of the tank in position to be welded.

Fig. 11 is a similar perspective view of the exterior side of the tank.

Referring more in detail to the drawings:

1 designates a truck tank constructed in accordance with the present invention, and which includes a shell 2 internally divided by a plurality of partitions 3 forming a series of compartments 4. The tank illustrated is of substantially elliptical cross-section and provided with lateral walkways 5 and 6 extending longitudinally of the sides of the tank and terminating at the outer edges in depending skirting 7 and 8 to house the chassis of the vehicle on which the tank is mounted. The elliptical wall of the tank proper is formed of a plurality of metal sheets, with the exposed portions of the tank forming smoothly rounded surfaces that are entirely free of dents, buckles and distortions incidental to welding of the sheets, to cooperate with the skirting and integral can or bucket box 9 at the rear and an end head 10 at the forward end of the tank to form a stream-line design in accordance with the present invention.

In order to provide the smoothly rounding surfaces for the exposed portions of the tank, and to avoid the appearance of seams, the sides 11 and 12 and adjacent rounded top portions 13 and 14 (Fig. 3) of the shell are formed of continuous metal sheets 15 and 16 that extend longitudinally of the tank and are curved to form the rounded top portions 13 and 14 which terminate along their upper edges in reverse bends 17 and 18 to connect with the vertical side portions 19 and 20, and bottom portions 21 and 22 of a recessed cat-walk extending longitudinally of the tank, the abutting edges of the portions 21 and 22 being welded at the median line of the tank. The recessed cat-walk forms a housing for the manhole covers 23 for each of the respective compartments 4. The open top of the cat-walk is preferably closed by a cover 24, having hinge sections 25 located in registry with the respective manhole covers. The lower side edges of the sheets are provided with beads or ribs 26 and 27 that are spaced inwardly therefrom with the spacing forming longitudinal side flanges 28 and 29.

The lower portion of the shell includes a series of transversely extending sheets 30 which close the spaces between the bulkheads 31 and 32 forming the partitions and which have marginal edges 33 and 34 underlying the flanges 28 and 29 and secured by tack welding 35 on the interior of the tank, as shown in Fig. 10, and by lines of exterior welding 36, as shown in Fig. 11. The adjacent end edges 37 and 38 of the respective transverse sheets are spaced apart and welded to lateral flanges 39 and 40 that extend peripherally of the pairs of bulkheads 31 and 32, as at 41 and 42. When the flanges 39 and 40 are welded directly to the outer shell of the tank, the welding produces the buckling effects as above mentioned, and to avoid this difficulty flat, metal strips 43 and 44 are first welded to the inner surface of the sheets 15 and 16, as later described, by welding 45 and 46 that secure the outer edges 47 and 48 of the strips to the inner surfaces of the sheets 15 and 16 so that the inner edges 49 and 50 are loose and free to flex, thereby adjusting themselves to any buckling that takes place when the edges 51 and 52 of the flanges 39 and 40 are welded to the inner surfaces of the strips, as indicated at 53 and 54. The strips 43 and 44 are are so located that the free edges are slightly spaced apart and the bulkheads are so located that the welding 53 and 54 is substantially in the center of the strips.

The spacing between the transverse sheets forming the bottom portion of the tank is preferably closed by metal strips 55 extending from the lower longitudinal edges of the side sheets 15 and 16 and which are welded to the flanges of the bulkheads by welding 56 and 57 (Fig. 11).

In order to provide a tight joint and a smooth surface on the interior of the tank where the ends of the strips 43 and 44 meet the overlapping margins 33 and 34 of the transverse sheets 30, the transverse sheets are notched, as at 58 and 59, to accommodate the terminal ends of the strips which extend beyond the flanges 28 and 29 of the side sheets 15 and 16, as best shown in Fig. 8. The adjacent portions of the bottom sheets are also counter-notched, as indicated at 60 and 61, so that the welding 45 and 46 can be carried completely to the terminal edges of the side sheets 15 and 16, as shown in Fig. 10. The edges of the counter-notches are also welded to the overlapping portions of the side sheets as shown in Fig. 10. The terminal ends of the strips thus project below the terminal edges of the side sheets and the welding 36 is carried thereacross. The terminal ends of the strips are also welded exteriorly of the tank to connect with the abutting portions of the notches and with the faces of the lateral flanges on the bulkheads, as shown in Fig. 11.

The bulkhead 62, closing the outer end of the rear compartment, is best illustrated in Fig. 5 and is attached to the marginal ends of the sheets 15 and 16 by an anchoring strip 63 that is inset from the end of the shell to accommodate a connecting band or strip 64 that is sleeved within the shell, and is secured by welding through a series of openings 65 formed in the band, as shown in Fig. 5. The band is of sufficient width to project beyond the terminal ends of the shell and provide a tongue 66 over which the streamlined bucket box 9 is sleeved and secured by welding through similar apertures 67. The forward end of the tank is closed in a conventional manner by the end head 10 conforming to the desired shape of that end of the tank.

To cover the expansion ribs 26 and 27, the inner sides of the walk-ways 5 and 6 are provided with kick plates 68 and 69 that extend upwardly over the ribs, as shown in Fig. 3.

The tank shell thus described is mounted on transverse girders 70 that are inset into slots formed in the transverse sheets 30, and are welded to the tank shell to form liquid-tight joints, in the manner illustrated in Patent No. 2,091,731 dated August 31, 1937. The ends of the girders project laterally from the tank to support the skirtings and to carry barrel or like housings 71 that are built into the skirting as best shown in Fig. 3, and to which access is had through doors 72, as shown in Fig. 1.

The girders 70 are mounted on spaced sills 73 and 74 extending longitudinally of the tank (Figs. 1 and 3). The respective compartments 4 are equipped with drain ducts 75 that extend rearwardly of the tank and into the can box 9, as in usual practice.

In assembling a tank constructed as described, the side sheets 15 and 16 are cut to the desired dimensions and provided with the ribs 26 and 27, and the pairs of strips 43 and 44 and the end strips 63 are welded to the inner surfaces thereof at the desired points where the bulkheads are to be located while the sheets are in flat condition, as shown in Fig. 7.

Welding of the strips will probably cause the sheets to buckle, but the sheets may be readily straightened while in flat condition by hammering out the buckles. The sheets are then rolled to the desired curvature after which the reverse bends 17—18, the vertical portions 19—20, and the horizontal portions 21—22 are formed in the upper edge of the sheet so that when the horizontal portions 21 and 22 are welded together the sheets will complete the upper shell of the tank. The double bulkheads 31 and 32 forming the partitions 3, and the end bulkhead 62 are then welded to the respective anchoring strips as shown in Fig. 4. At this time the end head 10 is secured in place as in conventional practice. Owing to the fact that the strips are welded only along one edge thereof, as shown at 45 and 46, the opposite edges are entirely free to accommodate themselves to any buckling or distortion occurring in the strips by the welding of the flanges 39 and 40 of the bulkheads. Since the distortion produced by the welding 53 and 54 is taken by the strips, there is no distortion in the outer sheets 15 and 16 and they retain their original imparted shape. The welds 45 and 46 along the inner edges of the strips seal the strips with the inner surface of the shell and the welding 53 and 54 along the edge of the flanges 39 and 40 seal the joints between the bulkheads and the shell so that the compartments are entirely leak-proof. The spaces between the bulkheads are vented through ports 76, as shown in Fig. 6.

All of the above welding is accomplished while the shells are in inverted position so that the welding is in the open. The bottom sheets 30 are then formed to size and shape and inserted in their proper positions relatively to the bulkheads and with their marginal edges 33 and 34 underlying the flanges 28 and 29 of the side sheets. The edges are then preferably tack welded to the flanges as at 35. The edges of the sheets 30 are then welded to the flanges 39 and 40 of the bulkheads as shown at 41 and 42, Fig. 11, and the side sheets 15 and 16 are welded to the ends of the sheets 30 along the edges of the overlapping flanges 28 and 29, as at 36. The projecting ends of the strips are also welded from the exterior side of the tank to the notched portions of the bottom sheets 30, as shown at 58 and 59 in Fig. 11. The strips 55 are then welded in position as shown. Any distortion that occurs incidental to effecting the longitudinal welds 36 is taken up by the ribs 26 and 27 so that the distortion is not carried into the upper or exposed portion of the tank. The girders are welded in the tank as described in the above mentioned patent, and the end head 10 and bucket box 9 are welded to their respective ends of the tank. The skirting and other accessories are applied to complete the tank assembly.

With a tank constructed and welded as above described the exposed side walls retain their original curvature, and there are no hollows to be filled with solder and the like as in present practice.

From the foregoing it is apparent that I have provided an improved tank construction wherein substantially all of the welds are effected in the open so that it is not necessary for the welder to enter any of the tank compartments. It is also obvious that by use of the anchoring strips the partitions may be welded into the tank without buckling the side sheets 15 and 16 which are the portions of the shell exposed to view.

What I claim and desire to secure by Letters Patent is:

1. In a tank including longitudinal sheets shaped to form the upper portion of the tank and having expansion ribs defining flanges along the lower edges of said sheets, attaching strips having one edge welded to the inner surface of the longitudinal sheets and having ends depending below said flanges, bulkheads welded to the attaching strips, and transverse sheets shaped to form the bottom portion of the tank and having side edges welded to the bulkheads and underlying ends welded to said flanges, said transverse sheets having notched portions to accommodate the projecting ends of the strips, the projecting ends of said strips being welded to the transverse sheets at the edges of said notches.

2. In a tank including longitudinal sheets shaped to form the upper portion of the tank, attaching strips having one edge welded to the inner surface of the longitudinal sheets and having ends depending below the lower edges of said sheets, bulkheads welded to the attaching strips, and transverse sheets shaped to form the bottom portion of the tank and having side edges welded to the bulkheads and ends welded to the lower edges of the longitudinal sheets, said transverse sheets having notched portions to accommodate the depending ends of the strips, the depending ends of said strips being welded to the transverse sheets at the edges of said notches.

3. In a metal structure forming a shell-like body, a sheet member dividing said body into compartments and having an attaching edge, said shell-like body including a wall sheet extending completely across said attaching edge to present a smooth continuous exterior surface, and an attaching strip having a side edge secured to the inner face of said wall sheet in spaced relation with said attaching edge of said sheet member and having a free portion extending between said inner surface of the wall sheet and said attaching edge of the sheet member, said attaching edge being secured to said free portion of the strip by a continuous weld, said free portion of the strip being flexible and capable of self-adjustment responsive to any distortion produced by said weld without producing deflections in the wall sheet.

4. A tank of the character described, including a wall sheet having an exposed portion presenting a smooth continuous exterior surface, a bulkhead having an attaching flange extending laterally therefrom and completely bridged by said smooth continuous portion of the wall sheet, and an attaching strip having a side edge welded to the inner face of the wall sheet and having a portion extending between said inner surface of the wall sheet and said flange of the bulkhead attached to said flange by a continuous weld spaced from the first named weld, said portion of the strip being unattached and free from the portion of the wall sheet extending thereover, whereby the attaching strip is adapted to flex and bend incidental to said flange weld without producing distortion in said wall sheet.

5. A tank of the character described, including an upper wall sheet having an outer face presenting a smooth continuous exterior surface longitudinally of the tank, spaced bulkheads located within the tank and having attaching edges at margins thereof, lower wall sheets welded to the upper wall sheet, and parallel attaching strips respectively disposed between said upper wall sheet and the bulkheads and having opposite edges attached to the inner surface of said upper wall sheet in coextensive spaced relation with the attaching edges of the bulkheads and having their remaining portions including their adjacent edges freely underlying said upper wall sheet, said attaching edges of the bulkheads being welded to the lower sheets and to the free portions of the respective strips in spaced relation with the attached edges thereof, said free portions of the attaching strips being flexible and capable of bending incidental to said welded connections without producing distortion in said upper wall sheet.

6. A tank of the character described including metallic sheets forming the upper and lower portions of the tank, bulkhead anchoring strips having one edge welded to the inner surface of the sheets forming the upper portion of the tank and having opposite edges freely underlying said sheets, said sheets forming the upper portion of the tank having expansion ribs extending longitudinally of the sides of the tank and defining depending flanges, said sheets forming the lower portion of the tank being welded to said flanges, and bulkheads welded to said anchoring strips intermediate the fixed and free edges thereof and to the sheets forming the lower portion of the tank.

7. A truck tank including metallic sheets of sufficient length to form the respective upper sides of the tank without presenting visible seams, a bulkhead anchoring strip having one edge welded to the inner surface of the sheets and having an opposite edge freely underlying said sheets, said sheets having expansion ribs extending longitudinally of the sides of the tank and defining depending flanges, a tank bottom welded to said flanges, and a bulkhead welded to said anchoring strip intermediate the welded and free edges thereof and to said bottom.

8. A truck tank including metallic sheets of sufficient length to form the respective upper sides of the tank without presenting visible seams, bulkhead anchoring strips extending transversely of said sheets and having one of their edges welded to the interior surface of the sheets, the opposite edges of said strips being entirely free and underlying said sheets, bulkheads welded to said strips intermediate said welded and free edges, bottom sheets having welded connection with the side sheets and having their ends welded to the bulkheads, and means formed in the side sheets adjacent the welded connections with the bottom sheets for preventing distortion of said side sheets incidental to welding.

HERBERT L. MIKA.